April 15, 1969  G. L. REDPATH  3,438,677
VIBRATOR FOR DUMPING VEHICLES
Filed March 21, 1967
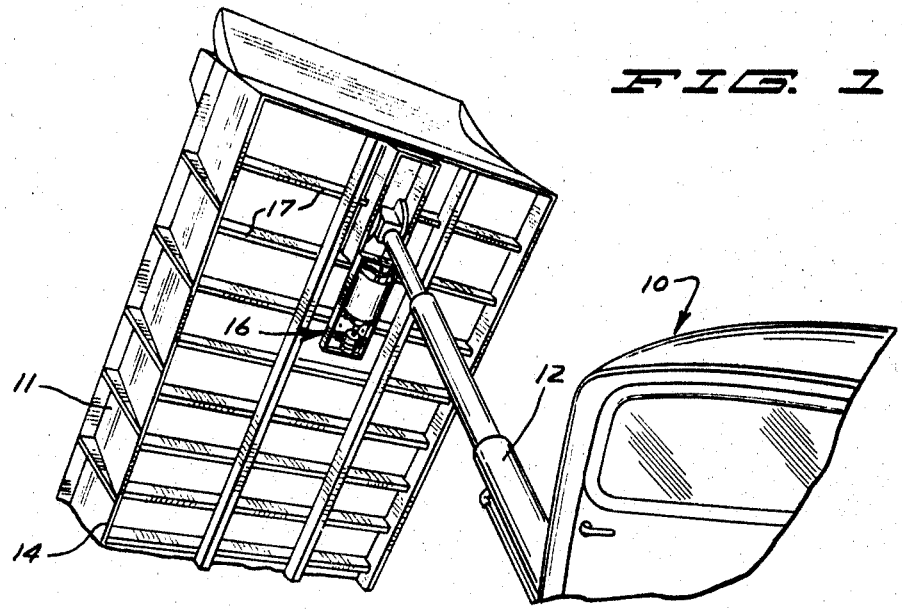
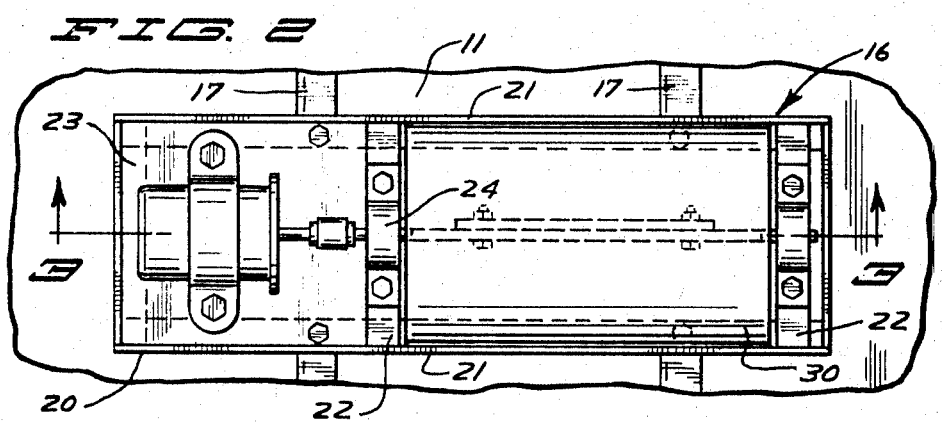
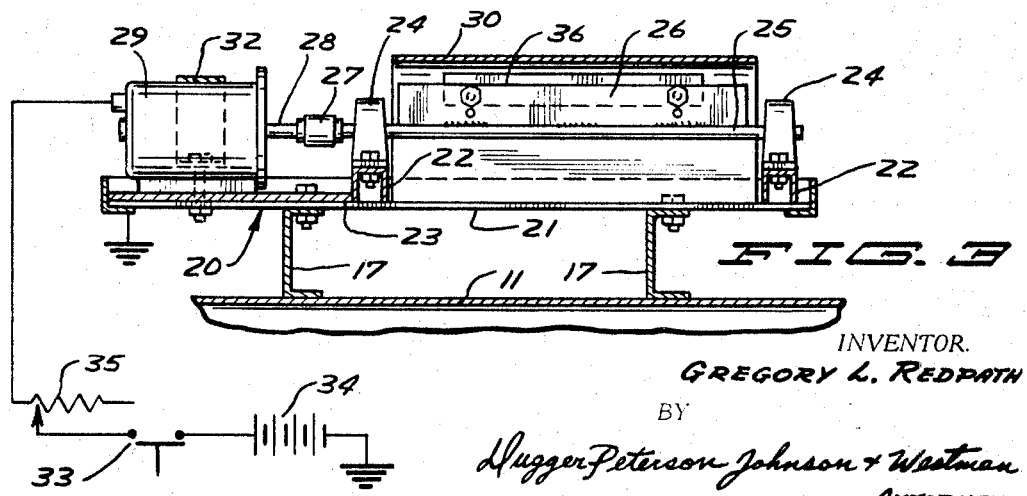
INVENTOR.
GREGORY L. REDPATH
BY
Dugger, Peterson, Johnson & Westman
ATTORNEYS United States Patent Office 3,438,677
Patented Apr. 15, 1969

3,438,677
VIBRATOR FOR DUMPING VEHICLES
Gregory L. Redpath, 5225 Baker Road,
Minnetonka, Minn. 55343
Filed Mar. 21, 1967, Ser. No. 624,777
Int. Cl. B60p 1/16, 1/58; F16h 33/10
U.S. Cl. 298—1                     6 Claims

ABSTRACT OF THE DISCLOSURE

Presented herein is a dumping vehicle, such as a dump truck which has a vibrator mounted on the box to remove any of the load in the truck when it is in dumping position. The vibrator comprises an electric motor controlled from the cab of the truck which drives a shaft having an eccentric weight thereon. The shaft is mounted in a pair of bearings. The complete unit is mounted onto a framework that in turn is bolted onto the bottom of the truck box or other dumping vehicle box. When the vehicle is in dumping position the vibrator is run in order to loosen material that adheres to the bottom or sides of the box. Electrical control means for adjusting the speed of the motor are included to permit varying the frequency of vibration. The addition of weight to the eccentric is provided for as well as adjustment of the weight with respect to the rotational axis of the shaft. As a D.C. motor is used to drive the eccentric this also slows down the motor and changes the frequency as well as the force of vibration.

BACKGROUND OF THE INVENTION

Field of the invention

The field of this invention is mobile dumping vehicles such as conventional dump trucks which have mounted thereon a vibrator for shaking the box or chamber used for carrying material to loosen any material that may adhere to the box itself.

Description of the prior art

At the present time, there are certain vehicles which use vibrators thereon for compacting, removing or conveying material. One of the limitations is that the sources of power are not easily conveyed so that the devices are not readily adapted for use on dump trucks that move over the road. Further, cost has been a very serious limitation for the production and use of vibrators suitable for aiding removal of material from the boxes of dump trucks.

SUMMARY OF THE INVENTION

The present invention presents a low cost, easily made, highly portable vibrator that can be mounted onto the bottom of conventional dump trucks merely by using four bolts to attach it to the cross stringers supporting the box of the truck. The unit is then merely connected to the electrical system of the truck through a switch and rheostat located in the cab of the truck and when it is to be used, the switch is closed starting the electric motor that rotates an eccentric shaft and shakes the box until any material that is adhering to the bottom or sides of the box will be loosened.

The present invention has a significant force factor because it utilizes a heavy eccentric weight. It is manufactured by attaching a heavy weight onto a shaft. The shaft is mounted in suitable bearings for carrying the load and driven through an electric motor which in the form shown comprises a starter motor from a truck. The assembly is mounted onto suitable framework and the framework is then just bolted to the box. The device can be transferred from box to box if desired, it is easily installed, and is very low cost to make.

It is therefore an object of the present invention to present a vibrator in combination with a dumping vehicle box that will aid in complete removal of the material to be dumped from the box.

BRIEF DESCRIPTION OF THE DRAWINGS

FIGURE 1 is a fragmentary perspective view of a truck box in dumping position and having a vibrator made according to the present invention installed thereon;

FIGURE 2 is a plan view of a vibrator made according to the present invention; and FIGURE 3 is a sectional view taken as on line 3—3 in FIGURE 2, with a schematic showing of the controls for the vibrator.

Referring to the drawings and the numerals of reference thereon, a dump truck illustrated generally at 10 is of conventional design and has a box 11 mounted thereon for hauling gravel or other material. A suitable hoist 12 is provided for tilting the box 11 about an axis at the rear of the truck frame to incline the floor of the box sufficiently to cause the material to flow or slide to the lower end 14.

In many instances where material that is sticky, such as wet clay or asphalt mix, or which freezes to the box, such as wet sand being hauled in cold weather, or other material such as snow which tends to pack and refuses to slide out through the end gate of the box, it has been common practice to jerk the truck forward and bang the conventional swinging end gate against the back of the truck to jar the box with sufficient force to cause the material to slide out. This is not only hard on the drive train (transmission, clutch and brakes) in the truck because the driver will drop the clutch very quickly, but it also bangs up the end gates causing premature failure of the box. The hoist used also is damaged by this action. The most frustrating part is that it is not very effective for moving the load. When pulling ahead and jamming on the brakes the load, if it does dump, is dumped in the wrong place and then has to be moved to its proper position. The driver usually ends up by crawling up into the box and shoveling it out by hand or else part of the load remains stuck in the box and this reduces the payload of the truck. In order to avoid this unpleasant, time consuming and therefore costly operation, the device of the present invention has been advanced. The device is bolted directly to the ordinary cross stringers 17 of a truck box 11. As shown, the vibrator assembly 16 is bolted to the cross stringers with four bolts only which pass through the framework supporting the vibrator assembly. The assembly is centered in transverse direction on the box and is near the front part of the box. Preferably, the position of the vibrator is in the front one-half of the box. Vibration at this point of the box will shake the box violently and cause material to be loosened very quickly.

The vibrator assembly itself comprises a frame 20. The frame 20 includes two parallel side members 21, 21 which are spaced apart and joined with two cross members 22, 22. The cross members 22 are channel shaped members with the web of the channel at the top. In addition, a motor mounting plate 23 is attached between the side members. The cross members 22 are used for mounting a pair of bearings 24, 24. The bearings 24 in turn rotatably mount a shaft 25 that has a solid rectangular bar 26 welded thereon. The shaft 25 is mounted with its axis extending in fore and aft direction on the box, or in other words in the same direction as the longitudinal axis of the box. The bar 26 is extended radially outwardly from the shaft on one side only. One end of the shaft protrudes beyond the bearings toward the motor mounting plate 23 and is coupled and driven through a flexible coupling 27 to an output shaft 28 of an electric motor 29. A guard or shield 30 is bolted or otherwise suitably attached to the frame 20. The shield prevents careless accidents when the unit is rotating.

The electric motor is a DC motor which will run off the electrical system of the truck and this motor is fastened to the motor mounting plate 23 with a suitable strap 32. The motor is made so it will normally rotate in the neighborhood of 2500 r.p.m. and will turn the shaft with its eccentric weight at this speed. This causes a tremendous shaking of the box to which it is attached, and breaks the adhesion of the material so it will slide right out of the box. The motor is controlled through a switch shown schematically at 33 (usually solenoid controlled in practice) mounted on the dashboard of the truck box and the motor in turn is powered from the battery 34 of the truck. The motor is also controlled through a rheostat 35 that serves to change the speed of rotation of the motor and thus the speed of the rotating shaft is changed. The reason for adjusting the speed is that the driver can adjust the speed so the frequency of vibration coincides with the natural frequency of the box system. The amplitude of vibration is thus greatly increased.

In practice using a starter motor for driving the eccentric shaft, and therein the shaft had a weight on it comprising a flat steel bar ⅞ inch thick, 2 inches wide and 19 inches long and actuating a vibrator constructed in this manner for approximately three to five seconds, quickly removed all material sticking to the box. The material being hauled was sand that was wet and the ambient temperature was well below freezing. The material would freeze to the box and upon vibration would break free. Boxes hauling the same type of material would not release the load and the operators had to get up into the box and shovel the load out. The device has also worked well with trucks hauling snow for shaking snow loose from the box when it is dumped. The vibrator will work with cement dump trucks, batch trucks for hauling asphalt mix, which is very sticky, as well as garbage trucks that have to dump. Its primary use will be in connection with dump trucks.

The weight of the bar 26 can also be changed to change the eccentric mass. Holes can be drilled through the bar 26 and a separate bar 36 can be bolted to the weight as shown. The addition of weight will affect the speed of rotation of the DC motor (additional load) and if desired the rheostat can be left off. The addition of weight will be made until maximum shaking is obtained on a particular box on which the vibrator is installed. Also, the bar 36 can be adjusted radially. Note there are two sets of holes for attaching the bar 36 at different radial positions. This changes the effective radius of action of the mass therefore changing the effective force of vibration. Many different weight adjustment devices can be used to get this variable force feature. The secret is to get the frequency of the vibration to match the natural frequency of the truck and box or some harmonic thereof. The frequencies should be in phase. If the natural frequency of the truck and the frequency of the vibrator are out of phase they tend to buck or cancel each other and this results in insufficient vibration to be satisfactory. This also may be termed getting the truck box and the vibrator vibrating in a sympathetic relationship.

The vibration caused by actuating the vibrator breaks the adhesion of the material to the box and lets the material slide out under gravity. The short duration of vibration necessary to achieve this result makes for a long life of both the vibrator and the truck box. The material is not conveyed by vibration. The material is merely loosened to permit it to slide out under the force of gravity.

What is claimed is:

1. In combination with a truck having a dumping box thereon and means on the box to permit material in the box to be removed from the box under the force of gravity, the improvement comprising a vibrator mounted on the exterior of the box at the bottom thereof, said vibrator comprising a frame having side members including spaced apart upstanding, longitudinally extending legs and means extending between said legs to hold the upstanding legs together, including co-planar wall portions integral with the legs forming mounting surface means positioned at substantially right angles to the legs, a longitudinally extending shaft, longitudinally spaced, separate mounting members extending transversely between said legs, bearing means mounted on said mounting members for rotatably mounting end portions of said shaft, eccentric weight means comprising a substantially radially extending bar attached to said shaft and extending longitudinally therealong between said mounting members, and extending outwardly on one side only of said shaft, motor mounting means extending between said legs, motor means mounted on said motor mounting means, means coupling an output shaft of said motor to one end portion of said shaft, and means to power said motor to rotate said shaft at a speed sufficient to vibrate said box to shake material in said box, said longitudinally extending upstanding legs being continuous from one end of said frame to the other and all of the components of said vibrator being directly supported by said frame member and the means extending between said upright legs.

2. The combination as specified in claim 1 wherein the axis of rotation of the shaft extends in fore and aft direction with respect to the box.

3. The combination as specified in claim 1 wherein said vibrator means is positioned transversely centered and on the front half of the box.

4. The combination as specified in claim 1 and means to permit attaching of additional weight to said bar.

5. The combination as specified in claim 1 wherein said motor means comprises a DC motor powered by the battery of said truck.

6. The combination as specified in claim 5 and speed control means in the circuit to said motor.

References Cited

UNITED STATES PATENTS

| 1,368,886 | 2/1921 | Bradley. | |
|---|---|---|---|
| 1,806,620 | 5/1931 | Flam | 259—72 |
| 2,018,046 | 10/1935 | Wilson. | |
| 2,060,130 | 11/1936 | Scott. | |
| 2,523,212 | 9/1950 | Hight | 298—1 X |
| 2,420,793 | 5/1947 | O'Connor | 259—1 |
| 3,343,876 | 9/1967 | Rapp | 298—1 |

RICHARDSON J. JOHNSON, *Primary Examiner.*

U.S. Cl. X.R.

74—87; 259—1